United States Patent [19]

Gardziella et al.

[11] Patent Number: 4,942,217

[45] Date of Patent: Jul. 17, 1990

[54] NOVEL HEAT-HARDENABLE BINDERS PHENOL-FORMALDEHYDE+HMT+ACID

[75] Inventors: Arno Gardziella, Witten-Rudinghausen; Alois Kwasniok, Iserlohn, both of Fed. Rep. of Germany

[73] Assignee: Rutgerswerke AG, Fed. Rep. of Germany

[21] Appl. No.: 263,066

[22] Filed: Oct. 26, 1988

[30] Foreign Application Priority Data

Nov. 17, 1987 [DE] Fed. Rep. of Germany ....... 3738902

[51] Int. Cl.$^5$ .................... C08G 8/10; C08G 14/04; C08F 6/22; C08K 5/42
[52] U.S. Cl. .................................. 528/129; 528/139; 528/143; 528/144; 528/146; 525/480; 525/481; 525/500; 525/501; 525/502; 525/503; 525/504; 525/505
[58] Field of Search ............... 525/429, 480, 481, 500, 525/501, 502, 505, 503, 504; 528/107, 129, 139, 143, 144, 146

[56] References Cited

U.S. PATENT DOCUMENTS

| | | | |
|---|---|---|---|
| 4,433,119 | 2/1984 | Brode et al. | 525/500 |
| 4,578,448 | 3/1986 | Brode et al. | 528/139 |

FOREIGN PATENT DOCUMENTS

| | | | |
|---|---|---|---|
| 0739161 | 2/1970 | Belgium | 528/146 |
| 0010315 | 1/1979 | Japan | 528/504 |

*Primary Examiner*—Morton Foelak
*Assistant Examiner*—Carlos Azpuru
*Attorney, Agent, or Firm*—Bierman & Muserlian

[57] ABSTRACT

A heat-hardenable binder comprising (a) a phenolic resin of a phenolic compound and formaldehyde in a molar ratio of 1:1 to 1:2 and (b) an effective amount of a hardener mixture of hexamethylenetetramine and an acidic latent hardening agent with reduced emission problems and curing rapidly.

21 Claims, No Drawings

NOVEL HEAT-HARDENABLE BINDERS PHENOL-FORMALDEHYDE+HMT+ACID

STATE OF THE ART

Binders based on a thermosetting phenolic resin and a hardener component are used as binders for foundry sand for the production of foundry molding materials wherein the sand, mixed with the binder, is brought into the desired form and the binder is hardened. The hardening of foundry molding materials occurs either by gassing with a gas that triggers the hardening (e.g. Cold Box method) or by heating to 200° to 300° C. (e.g. Hot Box method). Both types of methods have characteristic advantages and disadvantages and depend on machinery with different parameters which are generally process-specific.

In the known hot-hardening systems, the following disadvantages appear: The Hot Box method with a phenolic resol as resin and with acid hardeners as additives leads to short core sand processing times, especially in summer. Moreover, the production equipment fouls up too quickly and there may be relatively great odor molestation due to e.g. formaldehyde emission. While binder systems with Novolak and hexamethylenetetramine show no processing problems, they require relatively long hardening times under the conditions of the Hot Box method if a perfect casting quality is to be obtained in casting.

The use of specific resols which are hardened with hexamethylene tetramine (e.g. according to DE 3,423,878 A1) does lead to good storage properties of the sand and to satisfactory hardening times, but the thermal behavior of the molding materials during casting is poor. A certain thermoplasticity results, which may lead to considerable casting defects.

OBJECTS OF THE INVENTION

It is an object of the invention to provide a foundry binder which results when mixed with sand in a durable mixture curing rapidly at elevated temperature and hardens throughout and which makes possible good thermal properties of the cores and molds when casting.

It is a further object of the invention to reduce the binder-related emission problems to a minimum by making the proportion of free phenol less than 5% and to prevent any formaldehyde emission in excess of the MAC value (maximum acceptable concentration at workplace).

These and other objects and advantages of the invention will become obvious from the following detailed description.

THE INVENTION

The novel heat-hardener binders of the invention are comprised of (a) a phenolic resin of a phenolic compound and formaldehyde in a molar ratio of 1:1 to 1:2 and (b) an effective amount of a hardener mixture of hexamethylenetetramine and an acidic latent hardening agent. Such binders solve the prior art problems and are therefore excellently suitable as binder for hot production of cores and molds according to the above stated requirements in the foundry sector.

Examples of suitable phenolic resins are any alkali-condensed condensation product from a phenol and formaldehyde or a substance that eliminates formaldehyde under the condensation conditions, provided the molar ratio of the phenolic compound to formaldehyde is in the range of 1:1 to 1:2. Preferred are binders whose phenolic monomer component is less than 5%. Phenolic compounds that can be condensed to phenolic resols usable in the invention are phenol, cresols, xylenols, naphthols, and multivalent phenols such as pyrocatechin, resorcinol, hydroquinone or bisphenols, namely the pure compounds as well as mixtures of these phenols with one another.

To the binders of the invention are added for the production of molding and core sand 5 to 25% by weight, based on the phenols resin of the hardener component. The latter is a mixture of hexamethylenetetramine and an acid hardening agent in the weight ratio of 30:1 to 1:2, preferably 10:1 to 1:1. By the combination of two hardener types of fundamentally different hardening mechanism, the stipulated properties of the binder in the hardened state are obtained. Acidic latent hardening agents are acid substances which when mixed with phenolic resols do not cause hardening at room temperature or do so only very slowly, but act very quickly at higher temperature.

Such acidic latent hardening agents are adducts of strong inorganic or organic acids with at least one weakly basic or polar substance such as urea, hydroxyethyl aniline, polyols or hydroxypolyesters as well as salts of strong inorganic or organic acids and weak buses, particularly heavy metal salts of aromatic sulfonic acids.

Examples of preferred acidic latent hardening agents are adducts of urea, hydroxyethyl aniline or urea-hydroxyethyl aniline mixtures with sulfuric acid, phosphoric acid, benzenesulfonic acid, or toluene-sulfonic acid, adducts of benzene sulfonic acid, phenolic sulfonic acid or toluene sulfonic acid with polyols or hydroxypolyesters as well as ammonium nitrate, sulfate, or hydrogen phosphate, aluminum, magnesium, zinc or copper salts of sulfonic acids such as benzene sulfonic acid, phenolic sulfonic acid or toluene sulfonic acid.

Acidic latent hardening agents and hexamethylenetetramine are either premixed with one another or added to the sand separately. The phenolic resol, which is usually present in aqueous solution, is generally added to the sand mixture after the addition of the hardening agent.

The total quantity of binder and hardener in the molding sand is generally 1 to 3%. Cores and mold parts are shaped with the molding sand and hardened within a few seconds at temperatures in the range of about 150° to 300° C. The foundry mold bodies thus produced show good thermal behavior in casting and are suitable for all types of castings.

In the following examples there are described several preferred embodiments to illustrate the invention. However, it is to be understood that the invention is not intended to be limited to the specific embodiments.

EXAMPLE 1

In an apparatus for the production of condensation resins, a mixture of 3900 kg of phenol, 3766 kg of a 45% formalin and 65 kg of a 50% caustic soda solution was heated to 50° C. and reacted at 48° to 50° C. until the content of free formaldehyde was about 0.4%. After cooling, a pH value of 8.0 to 8.5 was adjusted with acid (e.g. p-toluene sulfonic acid) and the product was distilled under vacuum to a viscosity of 300 to 400 mPa.s to obtain a product containing 68 to 70% nonvolatiles (at 135° C.) according to DIN 16,916 Part 2 and about 4.5% free phenol.

EXAMPLE 2

Using the procedure of Example 1, a mixture of 3900 kg of phenol, 5017 kg of 45% formalin, and 177 kg of 50% caustic soda solution was added to the reactor and the mixture was kept at 60° C. for 1 to 2 hours until subsidence of the exothermal reaction. Then, the mixture was condensed at 80° C. to a content of free formaldehyde of 0.9 to 1.0%. Neutralization was followed by distillation under vacuum to a viscosity of 400 to 700 mPa.s to obtain a resin with a solids content of 70% and a content of free phenol of 3.0 to 3.5%.

BINDERS FOR MOLDING COMPOSITIONS

EXAMPLE 3

100 parts by weight of the resin of Example 1 were mixed with 5 parts by weight of hexamethylenetetramine and 6 parts by weight of a 50% aqueous solution of the aluminum salt of p-phenol sulfonic acid.

EXAMPLE 4

100 parts by weight of the resin of Example 1 were mixed with 6 parts by weight of hexamethylentetramine and 8 parts by weight of a 45% solution of the copper salt of p-toluene sulfonic acid.

EXAMPLE 5

100 parts by weight of the resin of Example 1 were mixed with 9 parts by weight of hexamethylenetetramine and 3 parts by weight of a 42% solution of the adduct of urea and p-phenol sulfonic acid.

EXAMPLE 6

100 parts by weight of the resin of Example 1 were mixed with 10 parts by weight of hexamethylenetetramine and 5 parts by weight of a 50% aqueous solution of the reaction product of urea, sulfuric acid and oxethylaniline.

EXAMPLE 7

100 parts by weight of the resin of Example 1 were mixed with 5 parts by weight of hexamethylenetetramie and 10 parts by weight of a 50% aqueous solution of ammonium nitrate.

EXAMPLE 8

100 parts by weight of resin of Example 2 were mixed with 4.5 parts by weight of hexametylenetetramine and 4.5 parts by weight of a 50% aqueous solution of the aluminum salt of p-phenol sulfonic acid.

EXAMPLE 9

100 parts by weight of the resin of Example 2 were mixed with 9 parts by weight of hexamethylenetetramine and 2.5 parts by weight of a 45% aqueous solution of the Cu salt of p-toluene sulfonic acid.

EXAMPLE 10

100 parts by weight of the resin of Example 2 were mixed with 10 parts by weight of hexamethylenetetramine and 5 parts by weight of a 42% aqueous solution of the reaction product of urea and p-phenol sulfonic acid.

EXAMPLE 11

100 parts by weight of the resin of Example 2 were mixed with 8 parts by weight of hexamethylenetetramine and 4 parts by weight of a 50% aqueous solution or the reaction product of urea, sulfuric acid and oxethylaniline.

EXAMPLE 12

100 parts by weight of the resin of Example 2 were mixed with 9 parts by weight of hexamethylenetetramine and 12 parts by weight of a 50% aqueous solution of ammonium nitrate.

EXAMPLE 13 (Comparison Example)

100 parts of by weight of the resin of Example 2 were mixed with 15 parts by weight of hxamethylenetetramine.

EXAMPLE 14 (Comparison Example)

100 parts by weight of a commercial Hot Box resin (70% phenol resol, Bakelite Resin 8586 GH) and 25 parts by weight of the respective commercial hardener (Bakelit 8587 H) were mixed together.

EXAMPLE 15 (Comparison Example)

100 parts by weight of the resin of Example 5 of patent application DE 3,423,878 were mixed with 15 parts by weight of hexamethylenetetramine.

Molding material mixtures containing 2% of phenolic resin, based on the quantity of sand, were produced and in a blade type mixer, the hexamethylenetetramine, the hardener, and lastly the phenolic resin were added to the quartz sand (Type H 33 of Quarzwerke Haltern). Mixing time of the individual components was 1 minute each.

The following tests were carried out on the molding material mixtures:
1. Bench life ("processability time")
2. Cold and hot tensile strengths
3. Hot distortion ("thermal stability")
4. Of the mixtures per Examples 10 and 11 as well as 13 to 15, cores were made, and after casting the thermal behavior was determined. The results are compiled in the attached Table. From the Table, the advantage of the new binder-hardener combination is clearly evident.

Elucidations concerning the tests per 1 to 4:

1. Bench Life

The moist molding material mixture was stored at room temperature and at certain intervals of time, the shapability per Item 2 was tested. The bench life was exceed when the strengths had decreased relative to the former mixture by 10 to 15%.

2. Cold and Hot Bending Strength

The molding material mixtures were processed to test specimens (165×22.5×22.5 min—sic) in a laboratory core shooter at a shooting pressure of 5 bars at 230 C. during 1, 2 and 3 minutes of bench time. The hot bending strength was determined immediately after removal from the tool and the cold bending strength was determined after cooling one hour after removal at the earliest.

3. Thermal Stability

For testing the thermal stability, the Hot Distortion Tester developed by the British Cast Iron Research Association was used and in this test the given specimen (hardening conditions: 230° C.-3 min.) was clamped at one end and a sensor was applied at the other free end. The central region was heated with a gas burner. First, a deflection of the free end of the specimen upward takes place and then it descends to the initial position or to a position below the initial position. As heating continued, the specimen breaks. The time and the degree of descent are a measure of the thermal stability of the specimen. It is the better, the later the descent occurs and the less it is. The rate of feed was 50 mm/min. Two values are given in the Table. The first indicates the highest upward deflection in diagram units and the second indicates the time of the return to the initial position in seconds. In the Examples 3 to 7 and 8 to 12 of the invention as well as in the comparison Example 14, a much later deformation occurs while in the comparison Examples 13 and 15, a very early one occurs.

4. Casting Result

There were produced and cast parts (crankcase cores) susceptible to deformation in the practice. Thereafter the dimensional deviation was measured.

Rating:
1=deviation±0.5 mm, satisfactory
2=deviation 2 mm
3=deviation 4 mm and more The results are reported in the following Table.

TABLE

| Example | Bench life | Cold bending strength in N/cm² after | | | Hot bending strength in N/cm² after | | | Hot distortion | | Casting result |
|---|---|---|---|---|---|---|---|---|---|---|
| | | 1 min | 2 min | 3 min | 1 min | 2 min | 3 min | Highest strike (cm) | Return to zero line (s) | |
| | | (Hardening time) | | | (Hardening time) | | | | | |
| 3 | 28 d | 360 | 600 | 670 | 190 | 330 | 420 | 2.4 | 102 | — |
| 4 | 28 d | 340 | 590 | 690 | 200 | 350 | 440 | 2.9 | 90 | — |
| 5 | 21 d | 350 | 680 | 740 | 190 | 370 | 430 | 2.2 | 96 | — |
| 6 | 21 d | 400 | 780 | 820 | 200 | 460 | 490 | 2.8 | 150 | — |
| 7 | 28 d | 470 | 610 | 630 | 220 | 340 | 410 | 3.6 | 114 | — |
| 8 | 28 d | 370 | 660 | 690 | 190 | 360 | 470 | 2.3 | 78 | — |
| 9 | 21 d | 340 | 680 | 710 | 190 | 370 | 490 | 2.3 | 72 | — |
| 10 | 21 d | 380 | 700 | 700 | 210 | 380 | 480 | 2.2 | 118 | 1 |
| 11 | 21 d | 350 | 750 | 800 | 230 | 490 | 540 | 2.5 | 118 | 1 |
| 12 | 28 d | 450 | 600 | 650 | 190 | 390 | 440 | 2.6 | 102 | — |
| 13 | 42 d | 650 | 690 | 740 | 270 | 400 | 460 | 1.8 | 37 | 2 |
| 14 | 2–4 h | 630 | 690 | 770 | 215 | 340 | 390 | 2.3 | 138 | 1 |
| 15 | 56 d | 550 | 600 | 620 | 220 | 340 | 400 | 1.5 | 30 | 3 |

Various modifications of the products of the invention may be made without departing from the spirit or scope thereof and it should be understood that the invention is intended to be limited only as defined in the appended claims.

What we claim is:

1. A heat-hardenable binder comprising (a) a phenolic resin of a phenolic compound and formaldehyde in a molar ratio of 1:1 to 1:2 and (b) an effective amount of a hardener mixture of hexamethylenetetramine and an acidic latent hardening agent.

2. A binder of claim 1 the amount of hardener mixture is 5 to 25% by weight based on the phenolic resin.

3. A binder of claim 1 wherein the weight ratio of hexamethylenetetramine to acidic latent hardening agent is 30:1 to 1:2.

4. A binder of claim 1 wherein the acidic latent hardening agent is an adduct of a strong acid and urea.

5. A binder of claim 1 wherein the acidic latent hardening agent is an adduct of a strong acid and hydroxyethylaniline.

6. A binder of claim 1 wherein the acidic latent hardening agent is a salt of a strong acid and weak base.

7. A binder of claim 1 wherein the acidic latent hardening agent is a heavy metal salt of an aromatic sulfonic acid.

8. A binder of claim 1 wherein the acidic latent hardening agent contains at least one member of the group consisting of a polyol and a hydroxypolyester.

9. A binder of claim 1 wherein the acidic latent hardening agent is an adduct of a strong inorganic or organic acid and at least one member of the group consisting of a polyol and a hydroxypolyester.

10. A binder of claim 1 wherein the phenolic resin has a content of free phenolic compounds of less than 5%.

11. A molding sand containing the heat-hardenable binder of claim 1.

12. A molding sand of claim 11 the amount of harden mixture is 5 to 25% by weight based on the phenolic resin.

13. A molding sand of claim 11 wherein the weight ratio of hexamethylenetetramine to acidic latent hardening agent is 30:1 to 1:2.

14. A molding sand of claim 11 wherein the acidic latent hardening agent is an adduct of a strong acid and urea.

15. A molding sand of claim 11 wherein the acidic latent hardening agent is an adduct of a strong acid and hydroxyethylaniline.

16. A molding sand of claim 11 wherein the acidic latent hardening agent is a salt of a strong acid and weak base.

17. A molding sand of claim 11 wherein the acidic latent hardening agent is a heavy metal salt of an aromatic sulfonic acid.

18. A molding sand of claim 11 wherein the acidic latent hardening agent contains at least one member of the group consisting of a polyol and a hydroxypolyester.

19. A molding sand of claim 11 wherein the acidic latent hardening agent is an adduct of a strong inorganic or organic acid and at least one member of the group consisting of a polyol and a hydroxypolester.

20. A molding sand of claim 11 wherein the phenolic resin has a content of free phenolic compounds of less than 5%.

21. A molded body produced from the molding sand of claim 11.

* * * * *